United States Patent
Smith

(10) Patent No.: US 10,206,495 B2
(45) Date of Patent: Feb. 19, 2019

(54) VEHICLE RECEIVER HITCH-SUPPORTED CARGO RACK TRANSFORMABLE INTO A PICNIC TABLE WITH BENCHES

(71) Applicant: David Garside Smith, Lehi, UT (US)

(72) Inventor: David Garside Smith, Lehi, UT (US)

( * ) Notice: Subject to any disclaimer, the term of this patent is extended or adjusted under 35 U.S.C. 154(b) by 165 days.

(21) Appl. No.: 15/470,876

(22) Filed: Mar. 27, 2017

(65) Prior Publication Data

US 2017/0273452 A1 Sep. 28, 2017

Related U.S. Application Data

(60) Provisional application No. 62/313,450, filed on Mar. 25, 2016.

(51) Int. Cl.
| | |
|---|---|
| *B60R 9/06* | (2006.01) |
| *A47B 3/14* | (2006.01) |
| *A47B 85/06* | (2006.01) |

(52) U.S. Cl.
CPC .............. *A47B 3/14* (2013.01); *A47B 85/06* (2013.01); *B60R 9/06* (2013.01); *A47B 2003/145* (2013.01)

(58) Field of Classification Search
CPC B60R 9/045; B60R 9/06; B60R 9/065; B60R 2011/04
USPC .......................... 224/487, 282, 486, 488, 527
See application file for complete search history.

(56) References Cited

U.S. PATENT DOCUMENTS

| | | | | |
|---|---|---|---|---|
| 4,231,453 A | * | 11/1980 | Minor ...................... | A45C 9/00 190/11 |
| 4,537,443 A | * | 8/1985 | Bray ........................ | A47B 3/14 108/34 |
| 5,029,740 A | * | 7/1991 | Cox ........................ | B60R 9/065 190/15.1 |
| 5,106,002 A | * | 4/1992 | Smith ..................... | B60R 9/065 224/506 |
| 5,232,133 A | | 8/1993 | Speer | |
| 5,524,383 A | * | 6/1996 | Sanko ..................... | A01G 9/20 217/43 A |
| 5,881,937 A | | 3/1999 | Sadler | |
| 5,950,617 A | | 9/1999 | Lorenz | |
| 6,039,416 A | * | 3/2000 | Lambert .................. | A47B 5/06 108/48 |
| 6,109,687 A | * | 8/2000 | Nye ....................... | A47B 3/0911 297/139 |
| 6,189,458 B1 | | 2/2001 | Rivera | |

(Continued)

*Primary Examiner* — Brian D Nash
(74) *Attorney, Agent, or Firm* — Angus C. Fox, III

(57) ABSTRACT

An open-top cargo box transformable into a picnic table with attached benches releaseably attaches to a skeleton carrier equipped with a draw bar that engages a vehicle receiver hitch. When configured as a cargo box, a first bench functions as a floor of the box, the centrally-folded table top functions as a rear wall, and the second bench functions as the front wall. Four side panels, each of which is rigidly secured to one end of a bench and pivotally secured to a corner of a table top half, function as side walls. When transformed into a table with attached benches, the first bench and its attached side panels are lifted upwardly and rotated rearwardly 270 degrees, while unfolding the table top. Detachable end braces interconnect the ends of both benches, forming a rigid structure. Two folding leg assemblies beneath each bench support the entire structure.

27 Claims, 17 Drawing Sheets

(56) References Cited

U.S. PATENT DOCUMENTS

| | | | |
|---|---|---|---|
| 6,260,752 B1 * | 7/2001 | Dollesin | B60R 9/065 |
| | | | 224/495 |
| 6,314,891 B1 | 11/2001 | Larson | |
| 6,336,413 B1 * | 1/2002 | Ball | B60N 3/001 |
| | | | 108/44 |
| 6,511,088 B2 | 1/2003 | Kahlstorf | |
| 6,725,855 B1 * | 4/2004 | Brennan | A47J 37/0763 |
| | | | 126/276 |
| 6,739,269 B1 | 5/2004 | Benton | |
| 6,739,643 B1 * | 5/2004 | Rock | B60N 2/3011 |
| | | | 296/64 |
| 6,808,231 B1 | 10/2004 | Hill | |
| 7,090,104 B2 | 8/2006 | Dorety | |
| 7,156,273 B2 * | 1/2007 | Morris | B60R 9/06 |
| | | | 108/14 |
| 7,533,940 B1 * | 5/2009 | Zook | A47B 83/02 |
| | | | 108/11 |
| 7,552,686 B2 | 6/2009 | Fisher | |
| 7,810,439 B2 | 8/2010 | Bless | |
| 7,922,245 B1 * | 4/2011 | Sawhney | A47B 3/14 |
| | | | 297/158.4 |
| 8,061,571 B2 * | 11/2011 | Aghajanian | B60R 9/06 |
| | | | 224/499 |
| 8,231,036 B2 * | 7/2012 | Campbell | B60R 9/065 |
| | | | 224/42.32 |
| 8,408,640 B1 | 4/2013 | Sawhney | |
| 8,616,630 B1 | 12/2013 | Midkiff et al. | |
| 8,684,453 B2 | 4/2014 | Furst | |
| 8,960,468 B2 * | 2/2015 | Boivin | B65D 19/42 |
| | | | 220/4.28 |
| 9,456,684 B1 * | 10/2016 | Frankel | A47B 3/14 |
| 9,718,411 B2 * | 8/2017 | Field, Jr. | B60R 9/06 |

\* cited by examiner

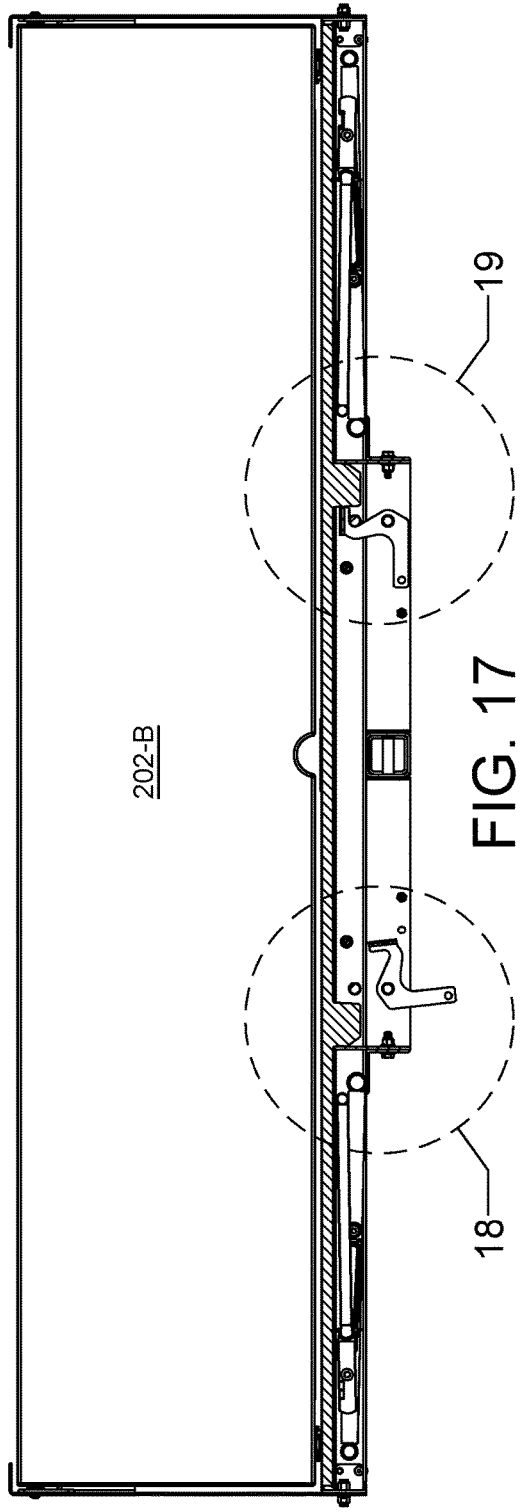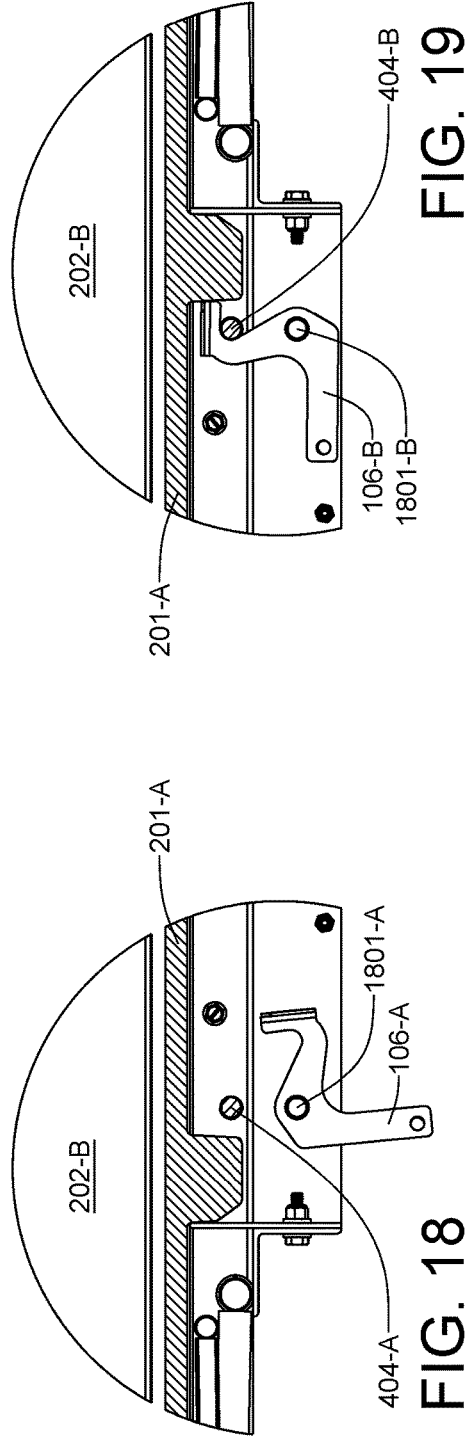

VEHICLE RECEIVER HITCH-SUPPORTED CARGO RACK TRANSFORMABLE INTO A PICNIC TABLE WITH BENCHES

APPLICATION DATA

This application has a priority date based on the filing, by the same inventor, of Provisional Patent Application No. 62/313,450 on Mar. 25, 2016, titled Vehicle Supported Cargo Rack that Converts into a Table with Seating.

FIELD OF THE INVENTION

This invention relates, generally, to carrier racks and cargo boxes that are couplable to a receiver hitch and, more specifically, to carrier racks and cargo boxes that not only couple to a receiver hitch, but unfold into a picnic table with benches.

BACKGROUND OF THE INVENTION

Most full-size automobiles from the 1960s had cavernous trunks. Even mid-size cars, such as the Mercedes-Benz 190 and 220 series had trunks that were sufficiently large to swallow a full-size 350cc motorcycle by simply removing the front wheel. In that era, airline flights were a luxury. Thus, most intracontinental travel was made by automobile. However, in the modern era in which airline passenger miles, according to US DOT statistics, have increased thirty fold since 1960, modern vehicles typically eschew large cargo carrying capacity in the interest of reducing vehicle weight, decreasing exterior dimensions, and increasing the vehicle's fuel economy in response to federal government corporate average fuel efficiency (CAFE) mandates. A major focus in the downsizing of passenger vehicles has been a dramatic reduction in front and rear overhang. As luggage and cargo has typically been carried behind the rear wheels, the cargo carrying capacity of newer vehicles has suffered accordingly. Increasing numbers of sport utility vehicles (SUVs or utes) now feature third row seating, which eliminates most interior cargo carrying capacity. This is especially true of new crossover utes, which typically have cramped third-row seating and virtually no interior cargo carrying capacity.

In spite of vehicle manufacturer's efforts to shrink the size of vehicles and reduce their cargo carrying capacity, there are many instances where more storage capacity in a vehicle is not only desirable, but essential. One method of increasing the cargo capacity of the vehicle is to use a cargo box. There are many commercially available cargo racks and cargo bins that mount to either the top or the rear of a vehicle for this purpose. There are also instances where exterior seating for the occupants of the vehicle once a destination has been reached is needed or, at least, desirable. Such a need commonly occurs when camping, hunting, tailgating, picnicking, and engaging in myriad other outdoor activities. There are many commercially available tables and chairs that fold and are capable of being stored in cargo areas of vehicles. However if such items are to be carried internally, then passenger count will, typically, be reduced. On the other hand, most modern personal vehicles, other than pickup trucks, simply do not have sufficient internal space to carry a full-sized picnic table and a pair of benches.

The prior art is replete with folding and non-folding tables that can be coupled to a receiver hitch on a vehicle. However, such tables typically do not increase cargo carrying capacity and rarely incorporate seating for six adults.

U.S. Pat. No. 8,684,453 to Eric Alexander Furst discloses a foldable picnic table that connects to the hitch of a vehicle. The picnic table includes condiment shelves, wheels and side tables.

U.S. Pat. No. 8,616,630 to Thomas Midkiff, et al. discloses a tailgating bench and table combination, including a bench portion, having a bench frame supporting a bench cushion, and further comprising a member insertable into a trailer hitch of a vehicle; a pair of leg members on the bench frame supporting the bench portion; a flat table portion, having a pair of legs on the front end supporting the table portion; a second member extending from the bench frame to support the rear end of the table in a horizontal position adjacent the bench portion; wherein the first member extends rearward from the bench to be inserted into the trailer hitch opening; and wherein the second member extends forward from the bench, and further includes an upright portion which is secured to an underside of the table portion.

U.S. Pat. No. 7,810,439 to Frank Brian Bless discloses a portable table system, couplable to a receiver-type trailer hitch, which comprises a pair of tables which are rotationally affixed to a support structure that allows movement from a deployed horizontal position to vertical positions in a stacked arrangement adjacent the rear of a vehicle.

U.S. Pat. No. 7,552,686 to Scott E. Fisher discloses a portable table apparatus that is releasable attachable to a vehicle. The apparatus comprises an adjustable horizontal assembly, one or more storage containers attached to that horizontal assembly, a vertical assembly and a table.

U.S. Pat. No. 7,090,104 to Joseph A. Dorety discloses a combination table and support member assembly for use in connection with a receiver-type trailer hitch mounted on a vehicle, where the support member and table can be joined in various configurations to vary the table height when in use and to vary the lateral separation distance between the rear of the vehicle and the table and vertical components of the support member when in use or in transport to allow for sufficient distance to enable utilization of the tailgate, rear door or hatch of the vehicle.

U.S. Pat. No. 6,808,231 to Marvin L. Hill discloses a seat assembly that can be releasably mounted to a vehicle's receiver-type trailer hitch. The device includes an elongated member having first and second ends. The first end is removably extendable into the trailer hitch. The elongated member has a perpendicular bend therein such that the second end extends upwardly when the first end is inserted into the hitch. A chair assembly is removably attachable to the second end of the elongated member. A footrest assembly is releasably attachable to the elongated member.

U.S. Pat. No. 6,739,269 to Micheal Wes Benton discloses a portable tailgate table having a first end adapted to be supported by a receiver-type trailer hitch mounted on a vehicle and a second end supported by at least one leg and wherein an upper surface of the table is pivotably adjustable about two pivot axes to permit horizontal leveling of the table top regardless of an angle of inclination of a parked vehicle which supports one end of the table.

U.S. Pat. No. 6,511,088 to William Kahlstorf discloses a trailer hitch mounting system that enables heavy duty equipment, such as a heavy duty table, a work station, a vise, a spool and/or a winch, and a level working surface, to be attached to the apparatus.

U.S. Pat. No. 6,314,891 to Michael Larson discloses a portable picnic table for tailgate parties that attaches to a receiver-type trailer hitch mounted on a vehicle. The table includes a frame having a transverse main beam, vertical supports extending upwardly from the main beam, and a mounting member extending forwardly from the main beam. The mounting member has a forward end adapted to be received in a trailer hitch receiver. First and second seats are attached by pivot connections to the respective ends of the main beam, and a table top is attached by pivot connections to the upper ends of the vertical supports. The seats and table top are each movable between a horizontal use position and a vertical transport position.

U.S. Pat. No. 6,189,458 to George Rivera discloses a collapsible holder having a first end that is couplable to a receiver-type hitch and a second end detachably coupled to a folding table. The collapsible holder can also serve to support a cooking grill.

U.S. Pat. No. 5,232,133 to William W. Speer discloses an article carrier having a vertical support member that is attachable to a trailer-hitch ball. The vertical support member can function as a bicycle or ski carrier. In addition, a table top can be attached to the vertical or ski carrier.

U.S. Pat. No. 5,950,617 to William D Lorenz discloses an accessory support system, attachable to a receiver-type trailer hitch, that can support recreational accessories such as grills, table tops and umbrellas designed for outdoor use. The system comprises a lateral support assembly adapted to connect to the trailer hitch, and one or more vertical support elements adapted to engage one or more accessories so that they are supported in a position suitable for use. The lateral support assembly, which may incorporate a pivot interconnecting two lateral arms, enables the grill to be positioned within about a 270-degree arc.

U.S. Pat. No. 5,881,937 to William R. Sadler discloses a vehicle cargo carrier attachable to a receiver-type trailer hitch. The cargo carrier is slidably mounted on an extendable tube that allows the cargo carrier to be moved aft so that it will clear the rear door or hatch of the vehicle on which it is mounted.

SUMMARY OF THE INVENTION

The present invention provides a cargo box that is couplable to a vehicle's receiver-type trailer hitch. Not only does the cargo box of the present invention increase the cargo carrying capacity of vehicles equipped with receiver hitches, but it also unfolds and transforms itself into a traditional picnic table with comfortable seating and plenty of table space for up to six adults. In order to provide a table with interconnected benches that is free of hitch components, a presently preferred embodiment of the invention provides a cargo box, which releaseably attaches to a skeleton carrier that is equipped with a draw bar that engages a vehicle receiver hitch. The cargo box is secured to the carrier by two pivotable latches, each of which engages one of two spaced-apart brackets that are secured to the underside of at least one of the benches.

Consistent with the foregoing needs, and in accordance with the invention as embodied and broadly described herein, the cargo box has a collapsed first configuration, in which one of the benches functions as a floor of the cargo box, the table top, which folds about a longitudinal center line functions as a rear wall, and the other bench functions as the front wall (nearest the vehicle). Four side panels, each of which is rigidly secured to one end of a bench and pivotally secured to a corner of a table top half, function as side walls for the cargo box. Thus, in its collapsed configuration, the cargo box is configured as a five-sided, open top box. For a preferred embodiment of the invention, the cargo box is sufficiently large to hold a cooler and a portable barbeque grill.

When transformed into a table with attached benches, the bench that forms the front wall and its attached side panels are lifted upwardly and rotated rearwardly a full 270 degrees, simultaneously unfolding the two-piece table top. A hinge is located between and at the bottom of the two table top halves so that when weight is placed on the assembled table, the adjacent edges at the hinge joint between the two table top halves butt up against one another, thereby preventing the top halves from collapsing so that they, together, form a generally planar surface. Beneath each bench is a brace that unfolds and attaches to the opposite bench, thereby creating a rigid structure consisting of the benches, the side panels, and the table top halves. As a pair of fold-up leg assemblies beneath each bench are lowered, a fold-together strut on each leg assembly unfolds and locks to create a rigid angle brace between each leg assembly and the bench.

The invention is constructed from four laminar structures, each of which has a planar surface: two bench tops and two table top halves. These structures can be fabricated from structural metal, such as steel or aluminum, wood, a structural thermoplastic such as polypropylene (PP) or acrylonitrile butadiene styrene (ABS), or other suitable materials, which include composites, such as polyester or epoxy resin reinforced with glass or carbon fibers. The strength of the laminar structures may be enhanced by incorporating a framework or honeycomb structure beneath the planar surfaces. This is particularly true where the laminar structures are fabricated from injection molded thermoplastics which have no reinforcing fibers.

BRIEF DESCRIPTION OF THE DRAWINGS

The position of components of the cargo box of the present invention will be designated in accordance with its orientation to a vehicle to which it is attached via its receiver hitch. Thus, the right side of the cargo box will correspond to the right side of the vehicle.

FIG. 17 is a cross-sectional view of the transformable cargo box, carrier and draw bar, taken through section plane 17-17 of FIG. 2;

FIG. 18 is a close-up detail view of the encircled portion 18 of FIG. 17; and

FIG. 19 is a close-up detail view of the encircled portion 19 of FIG. 17.

PREFERRED EMBODIMENT OF THE INVENTION

The present invention provides a cargo box that is couplable to a vehicle's receiver-type trailer hitch. Not only does the cargo box of the present invention increase the cargo carrying capacity of vehicles equipped with receiver hitches, but it also unfolds and transforms itself into a traditional picnic table with comfortable seating and plenty of table space for up to six adults. In order to provide a table with interconnected benches that is free of hitch components, a presently preferred embodiment of the invention provides a cargo box, which releaseably attaches to a skeleton carrier that is equipped with a draw bar that engages a vehicle receiver hitch.

The invention will now be described in detail with reference to the attached drawing FIGS. 1 through 19. It should be understood that the drawings may not be drawn to scale and are intended to be merely representative of the invention.

Figure 1:
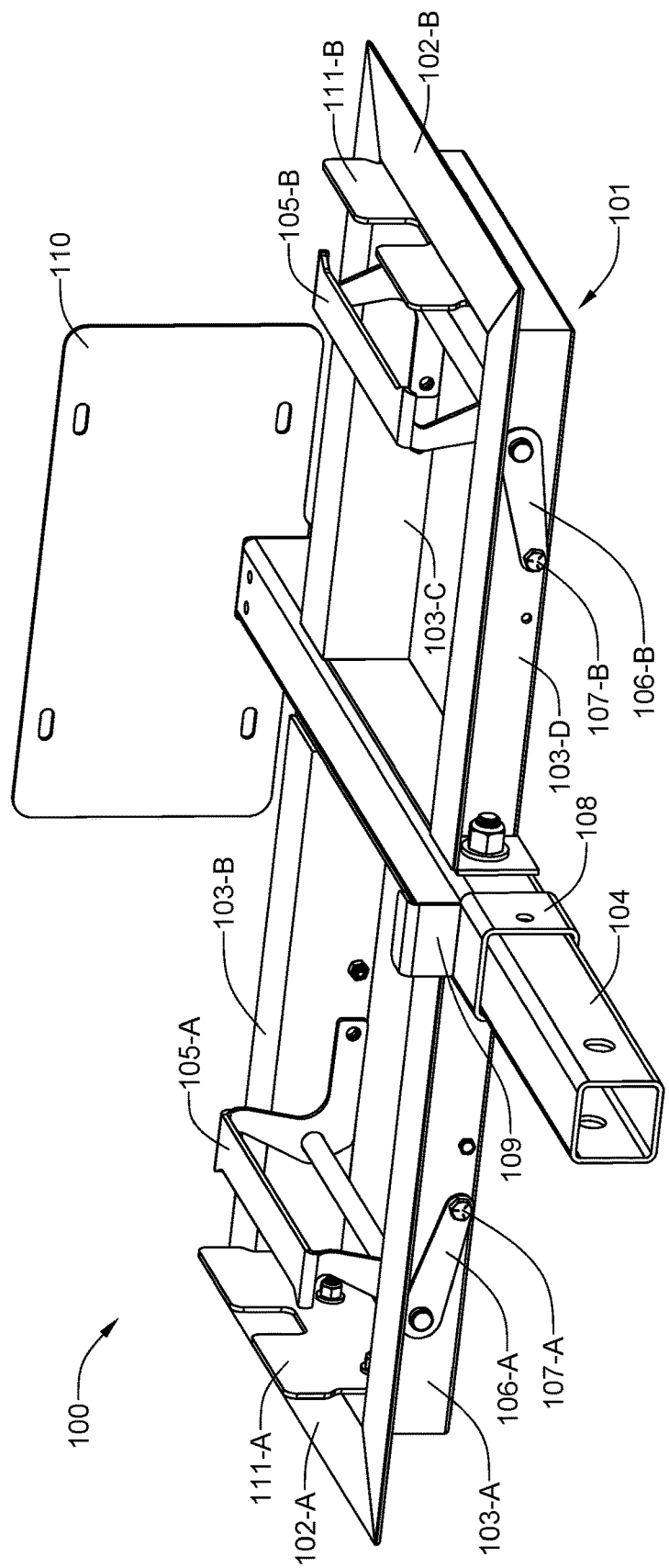
FIG. 1 is a primarily front isometric view of the carrier and draw bar.

Referring now to FIG. 1, a skeleton carrier 100 has a bilaterally symmetrical rectangular frame 101 that is welded together from two pieces of steel angle which are chamfered on both ends 102-A and 102-B, four pieces of steel angle that are chamfered on one end 103-A, 103-B, 103-C and 103-D, and a draw bar-size piece of square tubing 104 that slides into a vehicle hitch receiver (not shown). A pair of pivotable cargo box securing latches 105-A and 105-B are secured in a locked configuration (i.e., they would be securing the cargo box if it were resting on the carrier 100) with the actuation lever of each 106-A and 106-B, respectively, secured to the rectangular frame 101 with lock bolts 107-A and 107-B, respectively. Also visible in this view is a slidable safety collar 108 having an L-shaped bracket 109 that further secures the cargo box to the carrier 100. A license plate mounting frame 110 is secured to the rear of the carrier 100. In addition, a pair of bench alignment brackets 111-A and 111-B are bolted to frame members 102-A and 102-B, respectively. The function of these brackets will become apparent as the cargo box is described in detail below.

Figure 2:
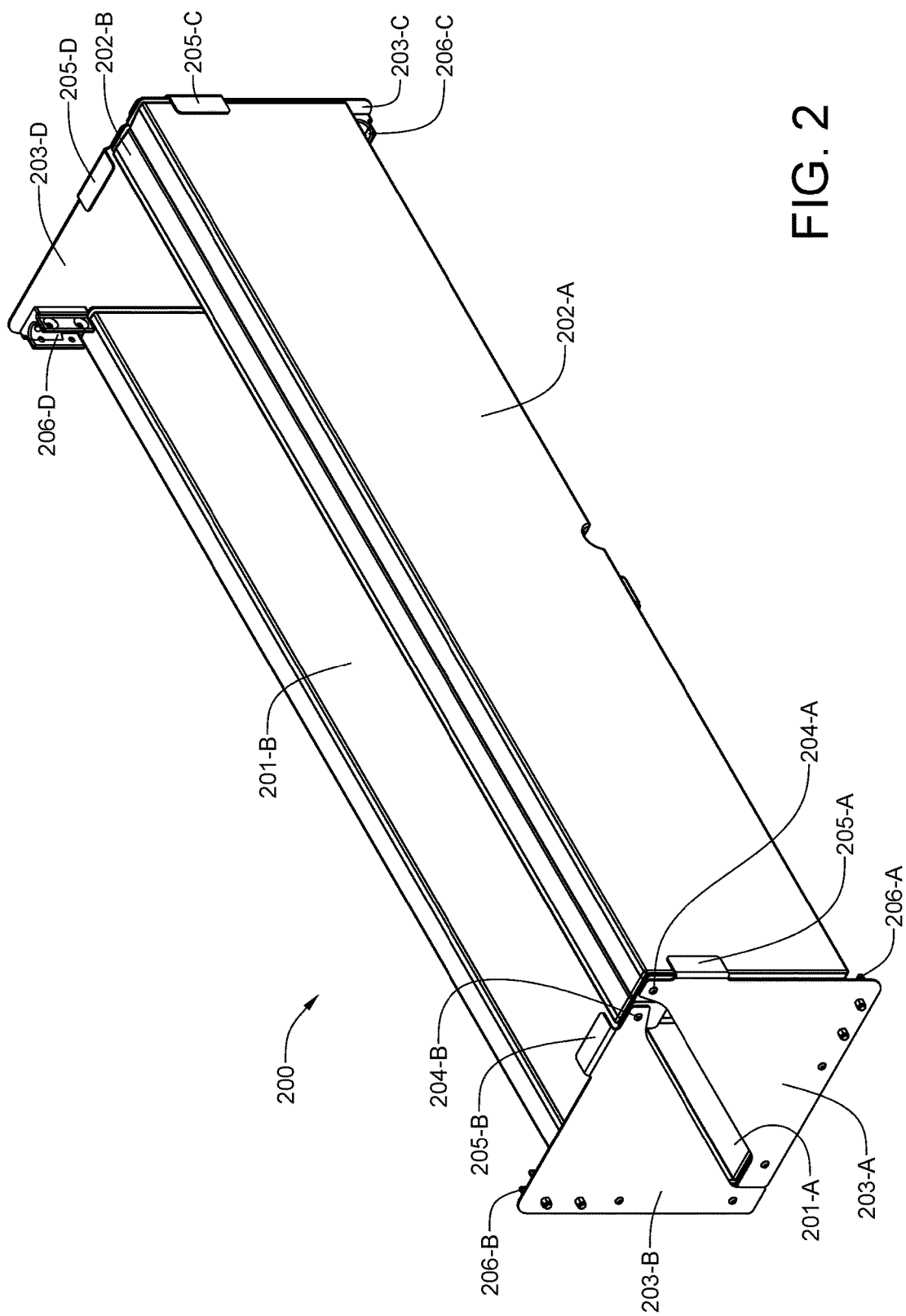
FIG. 2 is a side elevational view of a cargo box transformable into a picnic table with benches in a collapsed configuration attached to the carrier and draw bar of FIG. 1.

Referring now to FIG. 2, the transformable cargo box 200 is open at the top, and is formed from components that unfold into a picnic table having benches on opposite sides thereof. A first bench 201-A functions as the floor of the cargo box 200, a centrally-folded table top having first and second halves 202-A and 202-B functions as the rear wall of the cargo box 200, and a second bench 201-B functions as the front wall of the cargo box 200. Four side panels, 203-A, 203-B, 203-C and 203-D, each of which is rigidly secured to one end of a bench and pivotally secured to a corner of a table top half 202-A or 202-B, function as side walls. Two of the pivot pins 204-A and 204-B, which pivotally secure side panels 203-A and 203-B to table top halves 202-A and 202-B are visible in this view. Limit tabs 205-A, 205-B, 205-C and 205-D on each of the side panels 203-A, 203-B, 203-C and 203-D, respectively, limit rearward travel of the folded table top halves 202-A and 202-B when in the collapsed (cargo box) configuration. In this view, rearward travel is limited by limit tabs 205-B and 205-D. It should be understood that the cargo box can be longitudinally rotated 90 degrees so that the second bench 201-B will function as the cargo box floor and the first bench 201-A will function as the front wall. The table top halves 202-A and 202-B will then be limited in rearward travel by limit tabs 205-A and 205-C. Also fully visible is a single end brace securing bracket 206-D. End brace securing brackets 206-A, 206-B and 206-C are only partially visible in this view.

Figure 3:
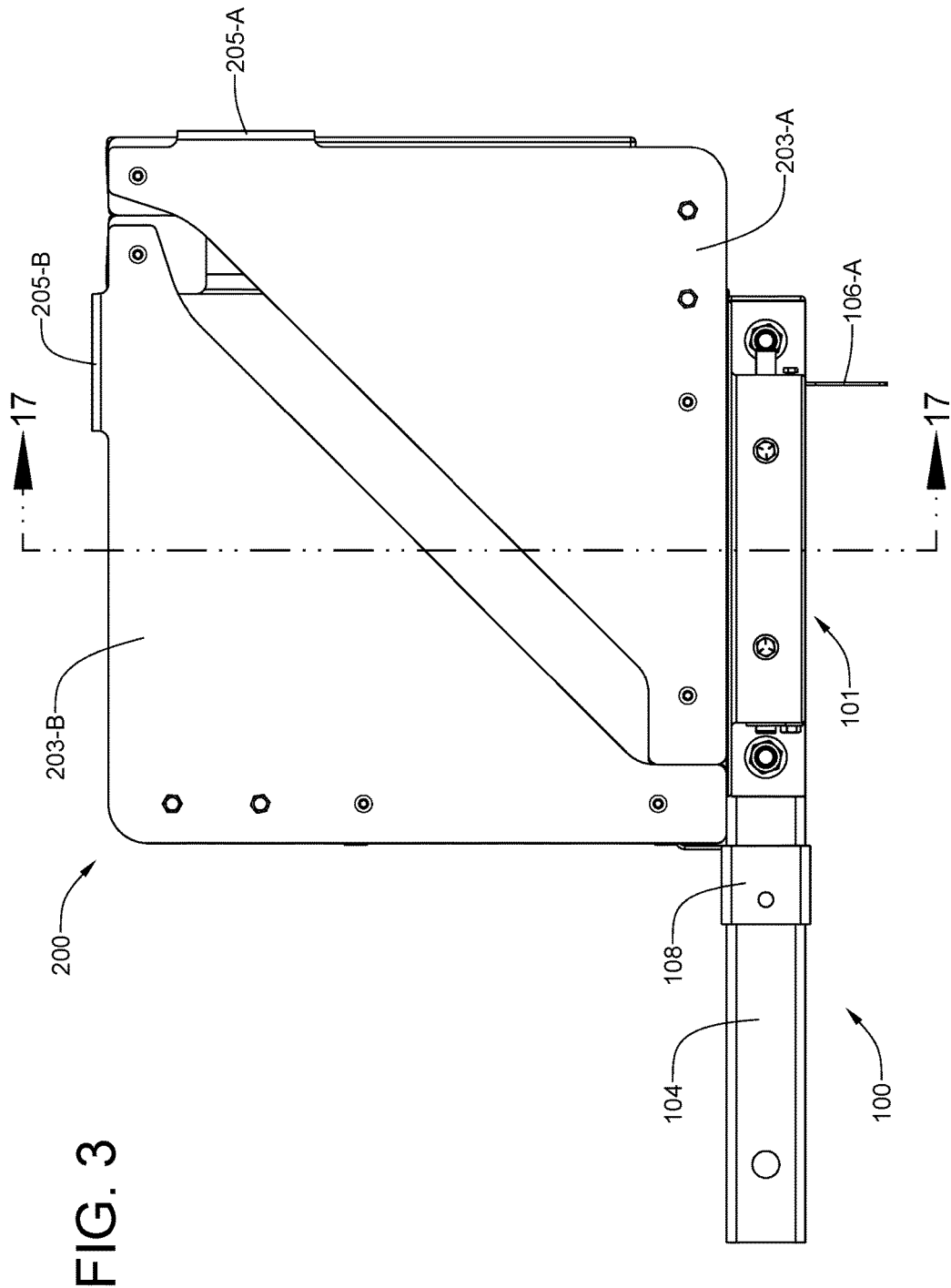
FIG. 3 is an isometric view of the cargo box transformable into a picnic table with benches removed from the carrier and draw bar, and in a collapsed configuration.

Referring now to FIG. 3, the cargo box 200 is seen from the side in a collapsed configuration partially secured to the carrier 100 (one of the latches is undone, as can be seen by the lowered actuation lever 106-A.

Figure 4:
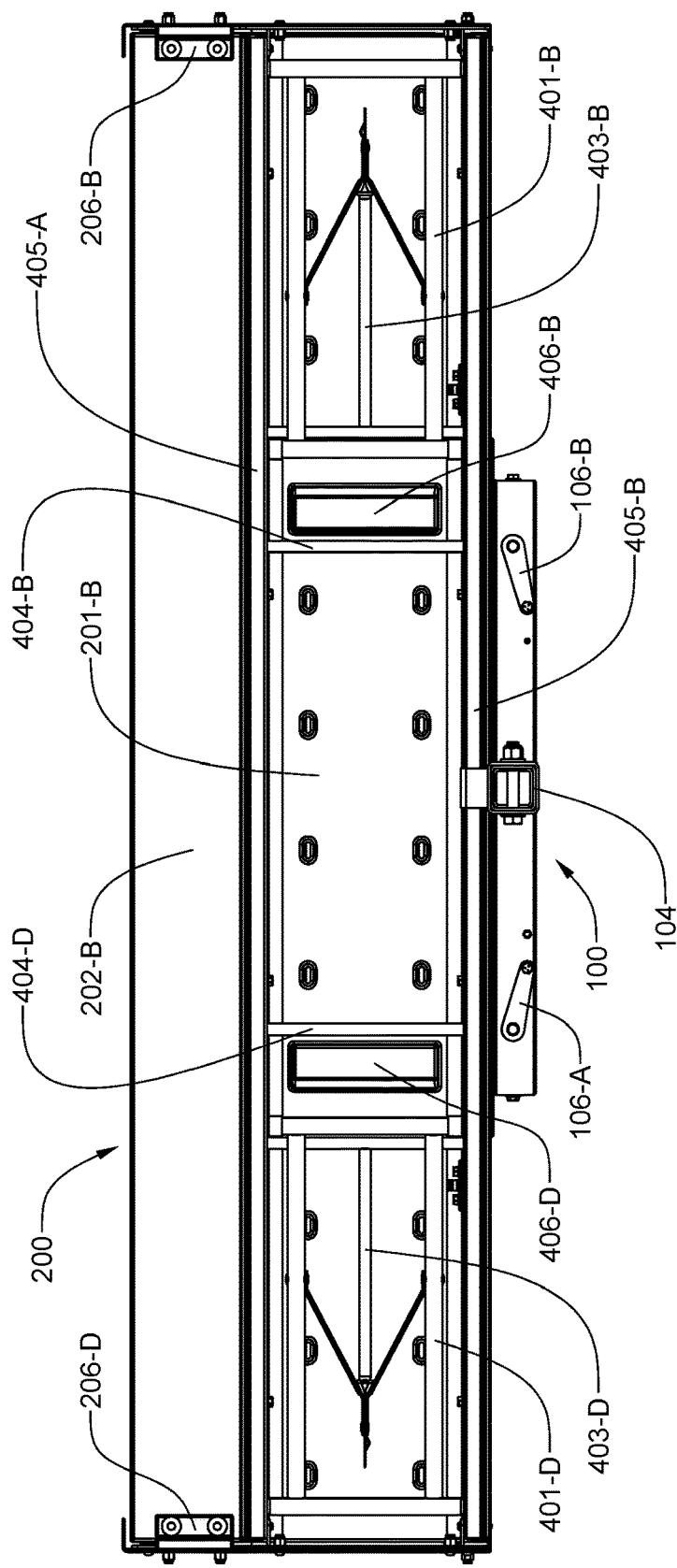
FIG. 4 is a front elevational view of the collapsed transformable cargo box attached to the carrier and draw bar.

Referring now to FIG. 4, in this front view of the cargo box 200 secured to the carrier 100, the underside of the second bench 201-B is completely visible, as are end brace securing brackets 206-A and 206-C. A pair of retractable leg assemblies 401-C and 401-D are pivotally attached to the underside of the second bench 201-B at pivotal axes 402-C and 402-D, respectively. Also visible are foldable struts 403-C and 403-D, which, when unfolded, secure folding leg assemblies 401-C and 401-D, respectively, so that they are perpendicular to the bench and able to support the bench 201-B, half the table and those seated on the bench 201-B. Also visible are two cargo box cross tubes 404-C and 404-D, which are rigidly secured to the opposed downward projecting edges 405-A and 405-B of the bench 201-B, and which are engaged by the latches 105-A and 105-B when the cargo box is secured to the carrier 100. A pair of alignment blocks 406-A and 406-B center the cargo box 200 on the carrier 100 so that the latches 105-A and 105-B can properly engage the cargo box securing cross tubes 404-C and 404-D. The first bench 201-A has features identical to those of the second bench 201-B, so that either bench of the cargo box 200 may be secured to the carrier 100.

Figure 5:
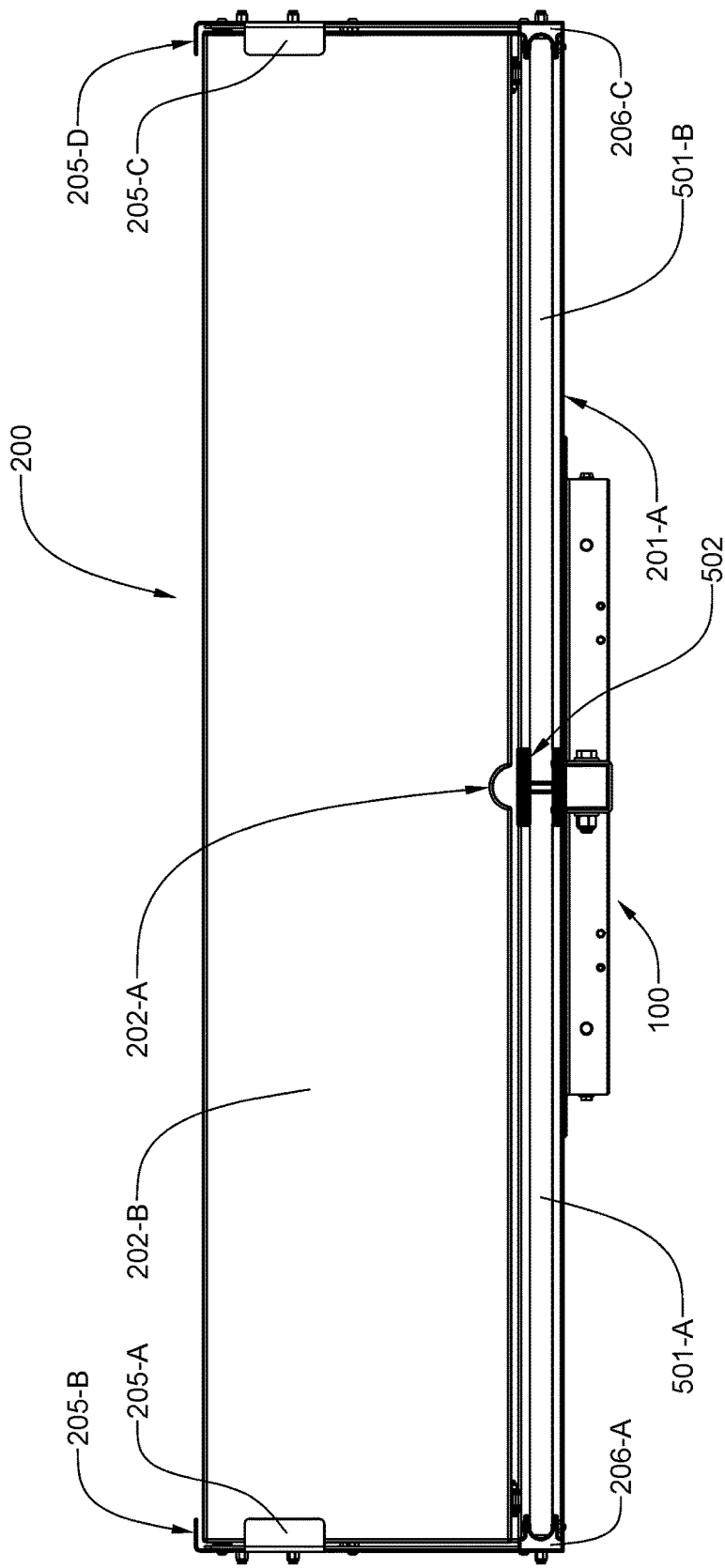
FIG. 5 is a rear elevational view of the collapsed transformable cargo box attached to the carrier and draw bar.

Referring now to FIG. 5, in this rear view of the cargo box 100 secured to the carrier 100, all major components, except for end braces 501-A and 501-B, have already been identified. The end braces 501-A and 501-B are used to tie opposing side panel pairs 203-A/203-B and 203-C/203-D together at the ends of the transformed table and bench structure in order to rigidify the structure. These end braces 501-A and 501-G are are seen in this view as being folded against the rear edge of the first bench 201-A. End brace 601-A is pivotally secured to end brace securing bracket 206-A, while end brace 601-B is pivotally secured to end brace securing bracket 206-C. A clip 602 hold the free end of each end brace secure during transport and storage. An umbrella pole cutout is visible in the center of the hinged edge of table top half 202-A.

Figure 6:
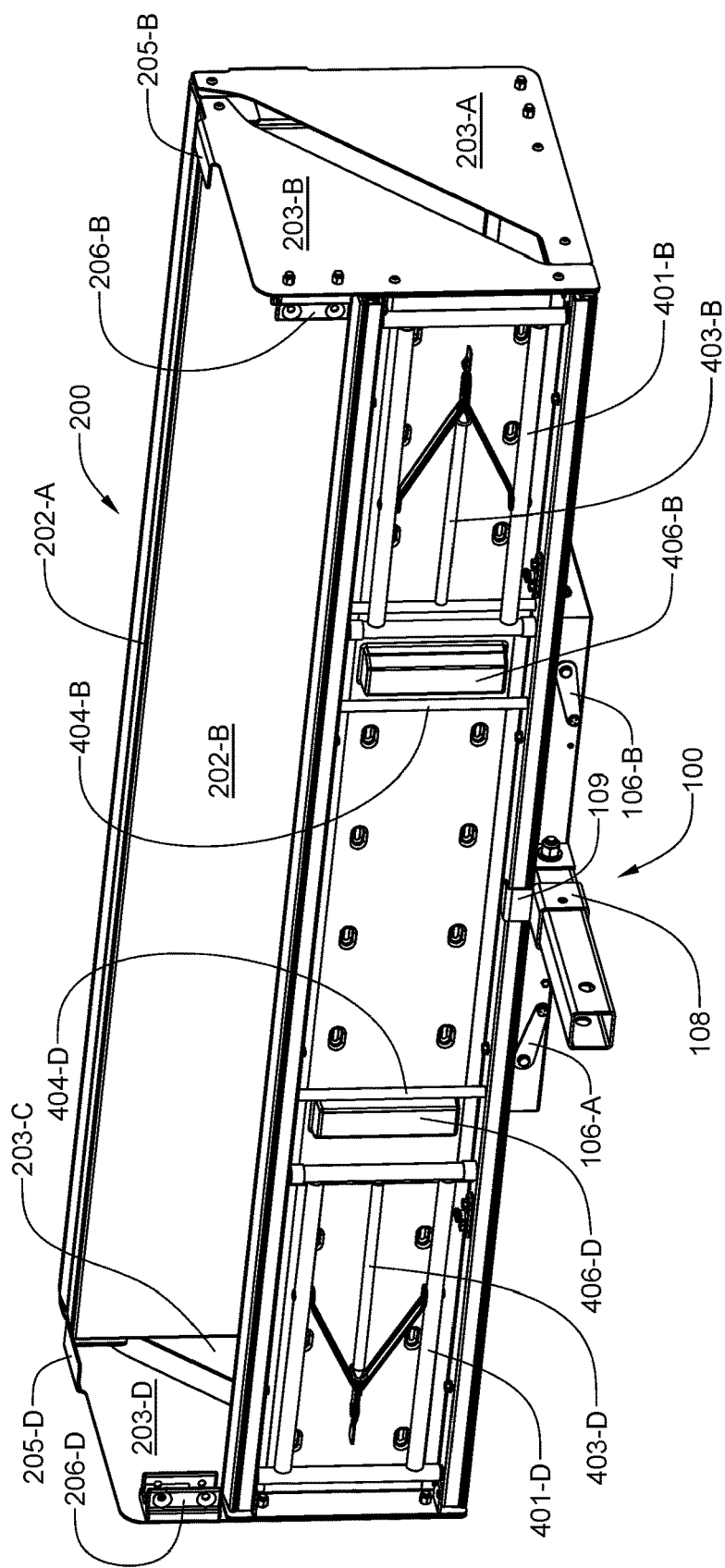
FIG. 6 is a primarily front isometric view of the collapsed transformable cargo box, carrier and draw bar.

Referring now to FIG. 6, this isometric view provides better visualization and comprehension of the shape of the cargo box 200 secured to the carrier 100. Elements thereof which have been previously identified are numbered accordingly.

Figure 7:
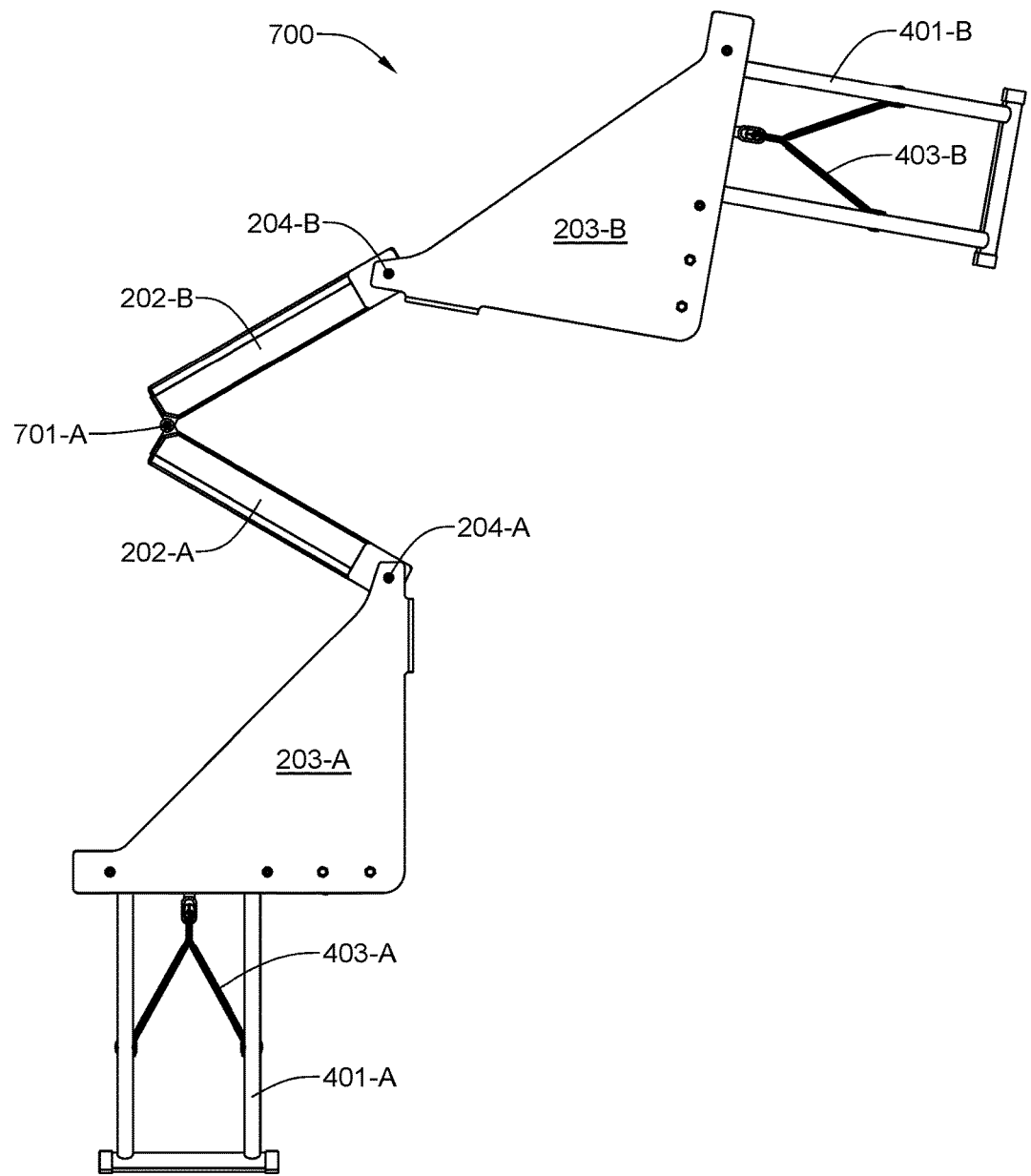
FIG. 7 is a first partly-deployed side elevational view of the transformable cargo box, apart from the carrier and draw bar.

Referring now to FIGS. 7 through 10, the cargo box 200 can be transformed into a table with attached benches by lifting the second bench 201-B (i.e., the bench that forms the front wall) and its attached side panels 203-A and 203-C upwardly and rotating them rearwardly a full 270 degrees, while unfolding the two hinged table top halves 202-A and 202-B. The cargo box 200, while undergoing transformation will be considered an intermediate configuration 700. As previously explained, the hinges 701-A and 701-B, only the first of which is first visible in FIG. 7, are located between the two table top halves 202-A and 202-B along the edges of the adjoining bottom surfaces, so that when weight is placed on the assembled table, the adjacent sides of the table top halves 202-A and 202-B butt up against one another, thereby preventing the top halves from collapsing so that they, together, form a generally planar surface. Both the first bench 201-A and the second bench 201-B have a pair of retractable leg assemblies on the undersides thereof. Those of the second bench 201-B have already been identified as items 401-B and 401-D. The retractable leg assemblies of the first bench 201-A will be identified as items 401-A and 401-C. A foldable strut is associated with each leg assembly, and bears the same letter designator as its associated leg assembly. Thus foldable strut 403-A is associated with retractable leg assembly 401-A, and so forth. As the retractable leg assemblies are downwardly pivoted, a foldable strut on each leg assembly unfolds and locks to rigidify the leg assembly so that it can reliably support weight of its associated bench, half the table and those seated on the bench. Thus, foldable struts 403-B and 403-D are used to rigidify the retractable leg assemblies 401-B and 401-D of the second bench 201-B when they are downwardly extended, and foldable struts 403-A and 403-C are used to rigidify the retractable leg assemblies 401-A and 401-C of the first bench 201-A.

Referring now to FIG. 7 in particular, the cargo box 200 is only partially unfolded. In fact, the second bench 201-B has been upwardly lifted and rotated only a little more than 180 degrees. In addition, although the table top halves 202-A and 202-B are only partially unfolded, the retractable leg assemblies 401-A, 401-B, 401-C and 401-C have all been downwardly pivoted and locked with the foldable struts 403-A, 403-B, 403-C and 403-D, respectively.

Figure 8:
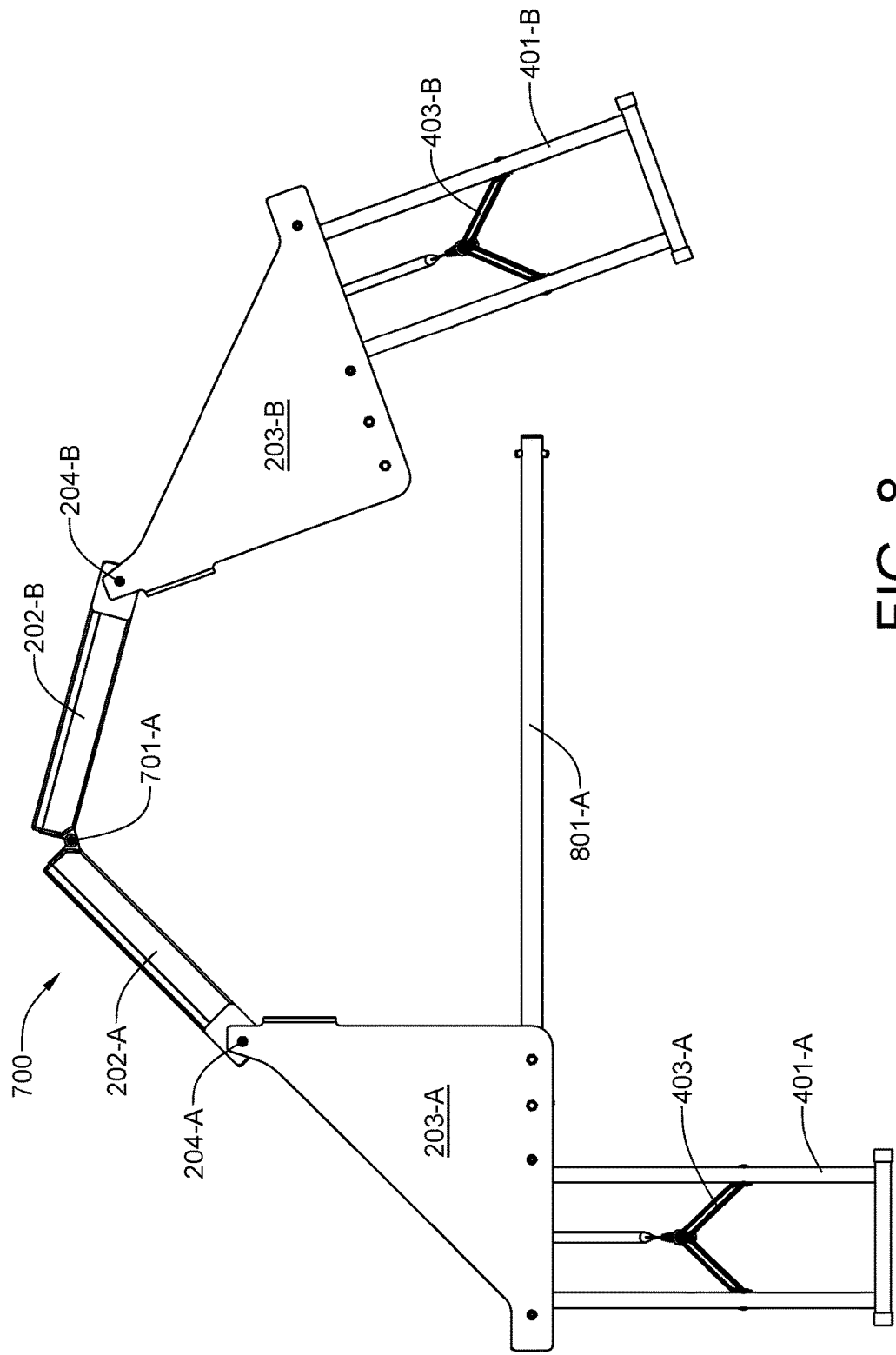
FIG. 8 is a second partly-deployed side elevational view of the transformable cargo box, apart from the carrier and draw bar.

Referring now to FIG. 8 in particular, the cargo box 200 is almost completely unfolded. A end brace 601-A is pivotally secured to side panel 203-A and will be secured to side panel 203-B when the cargo box is completely unfolded. End brace 601-B cannot be seen in this view. The second bench 201-B must still be rotated through about another 30 degrees, and the table top halves 202-A and 202-B must be completely unfolded to a planar configuration.

Figure 9:
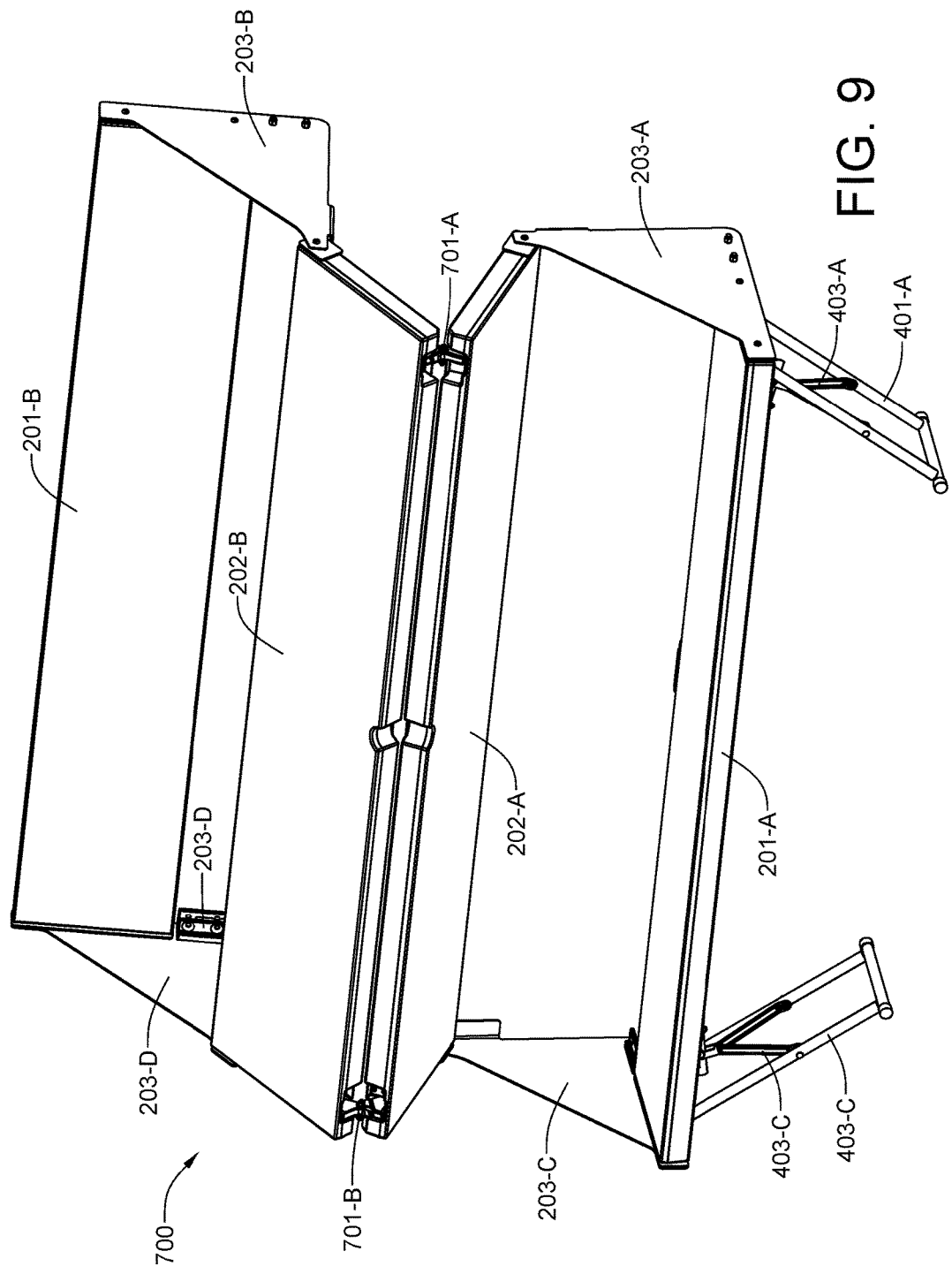
FIG. 9 is an isometric view of the transformable cargo box, in the partly-deployed configuration of FIG. 7.
Figure 10:
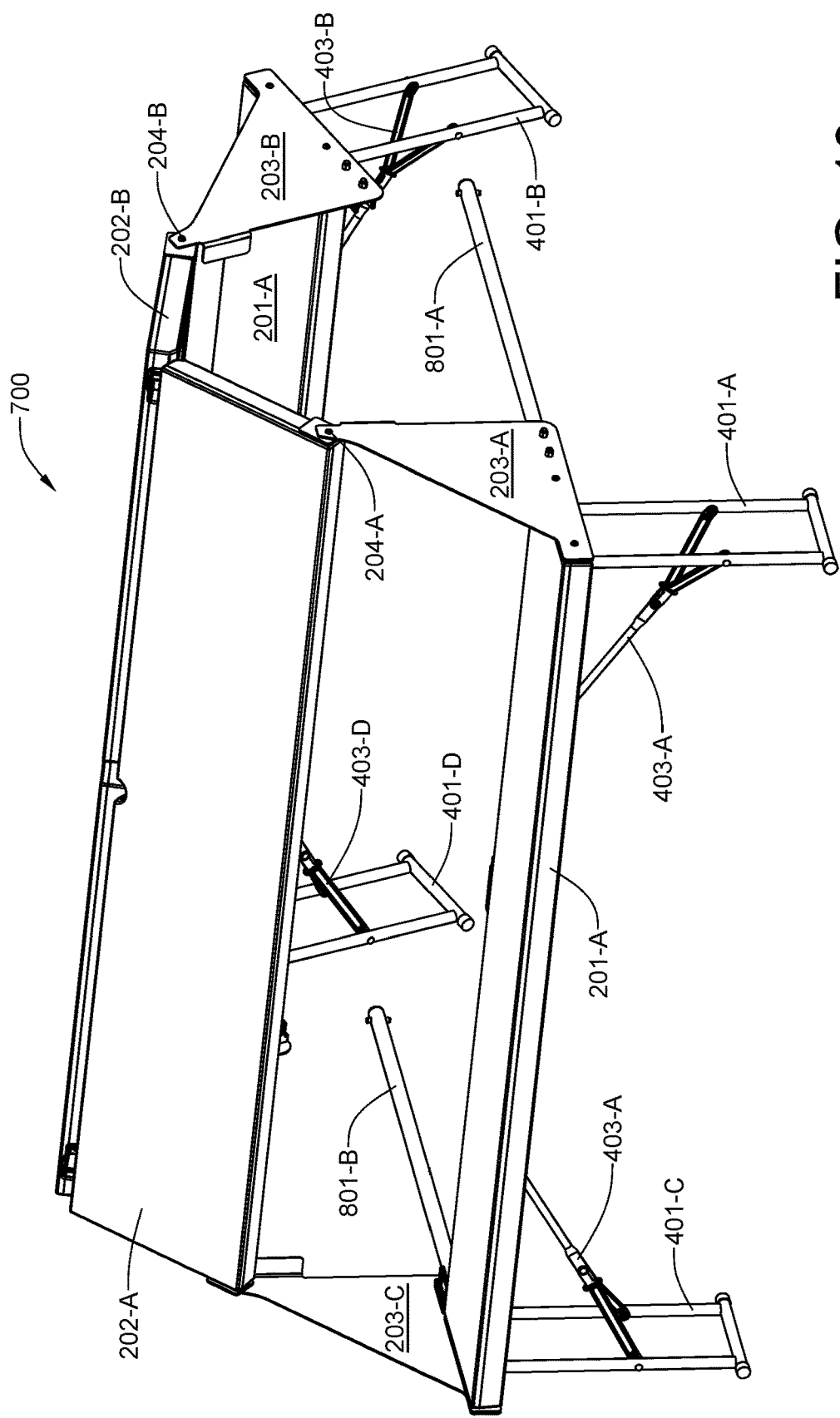
FIG. 10 is an isometric view of the transformable cargo box, in the partly-deployed configuration of FIG. 8.

FIGS. 9 and 10 are isometric views of the configurations of FIGS. 7 and 8, respectively. The only exception is that the leg assemblies of FIG. 9 do not appear to be less extended than those of FIG. 7.

Figure 11:
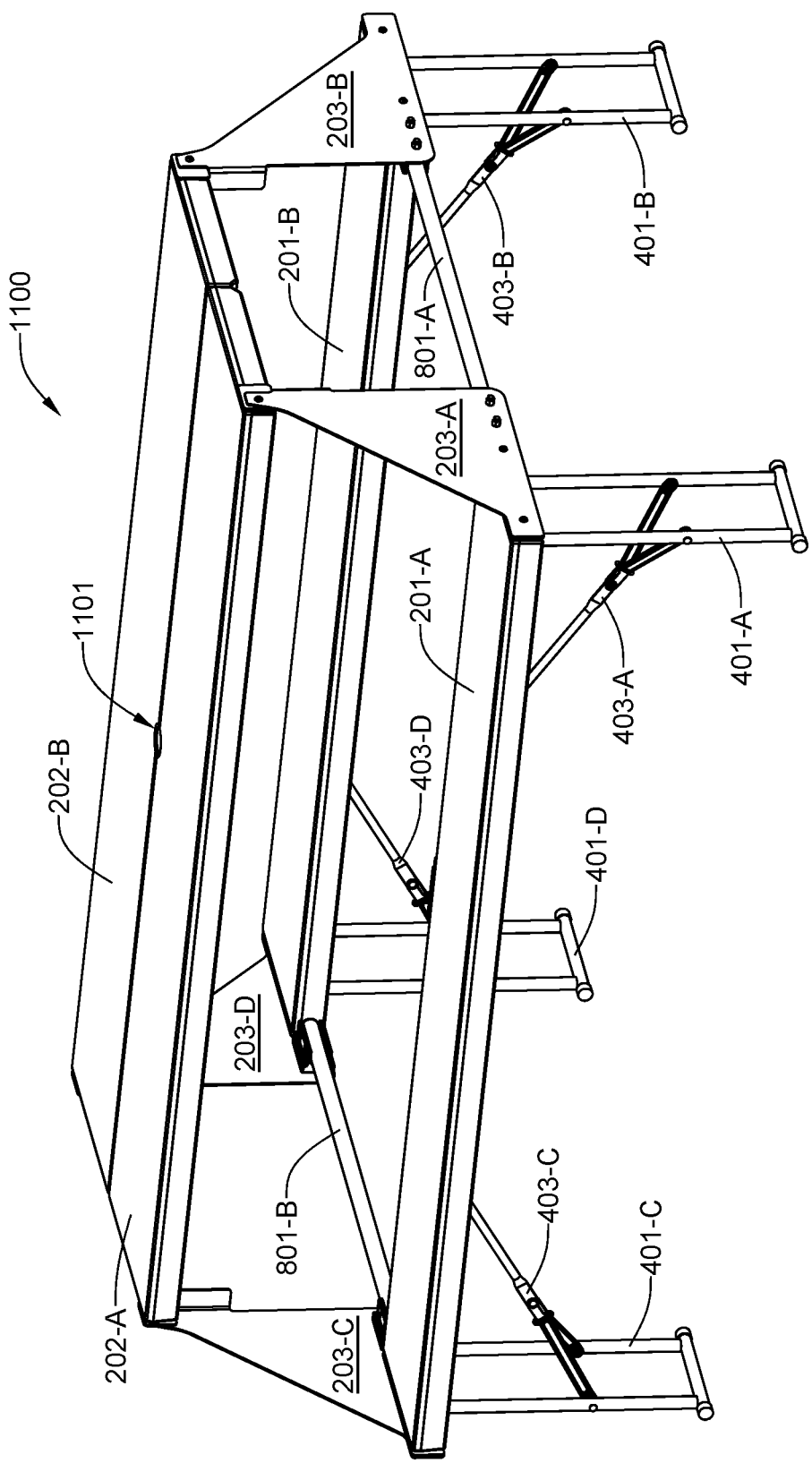
FIG. 11 is a low-elevation, three-quarter isometric view of the transformable cargo box in a deployed configuration apart from the carrier and draw bar.
Figure 12:
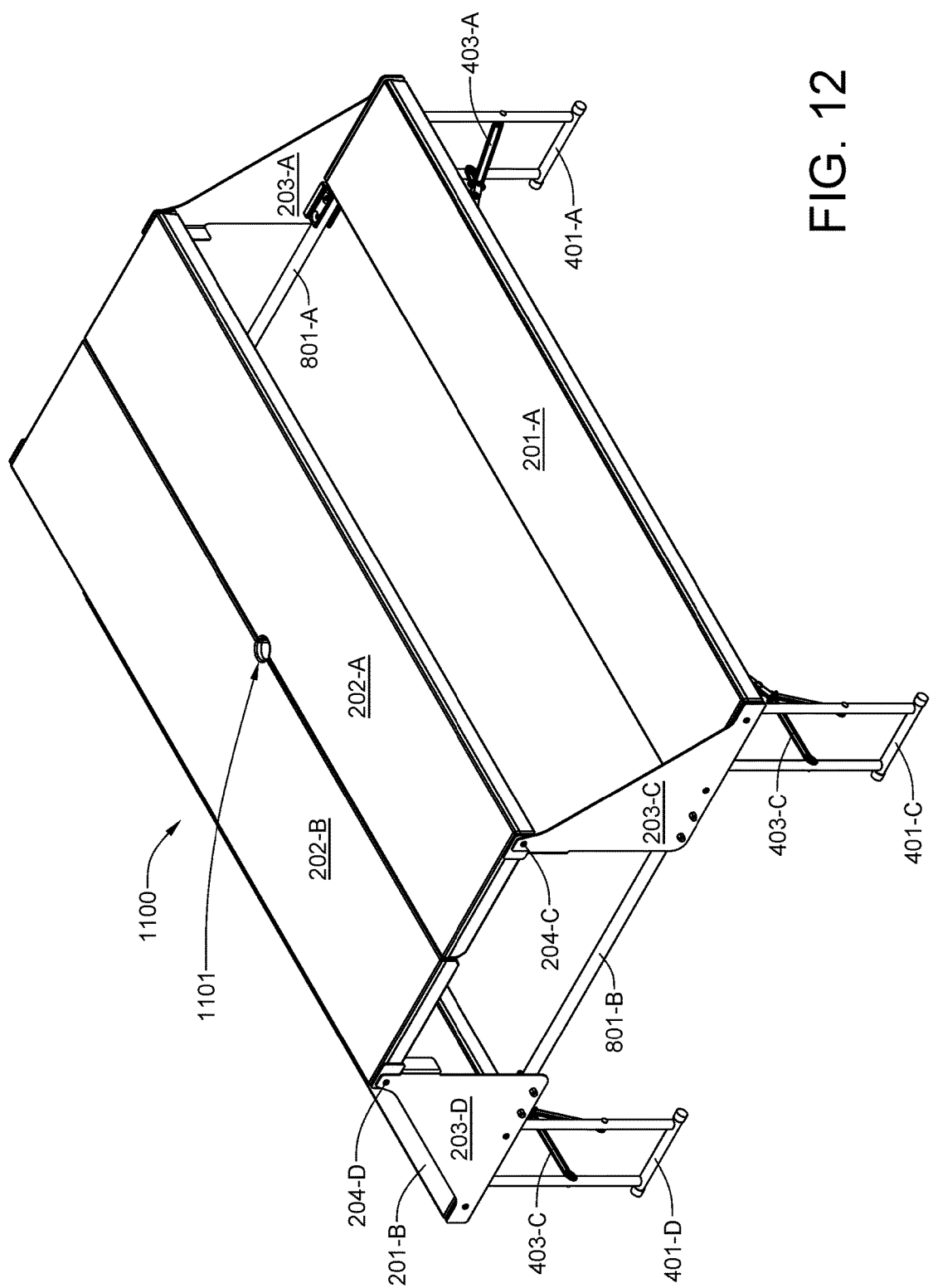
FIG. 12 is a high-elevation, three-quarter isometric view of the transformable cargo box in a deployed configuration apart from the carrier and draw bar.

Referring now to FIGS. 11 and 12, the cargo box 200 has been completely transformed into a picnic table with attached benches 1100. It will be noted that end brace 801-A now interconnects side panels 203-A and 203-B, while end brace 801-B interconnects side panels 203-C and 203-D. When installed, the end braces 801-A and 8010-B rigidify the entire structure. It will be noted that the table top halves 202-A and 202-B are completely unfolded, resulting in a planar table top having an umbrella pole cut-out 1101 in the center thereof.

Figure 13:
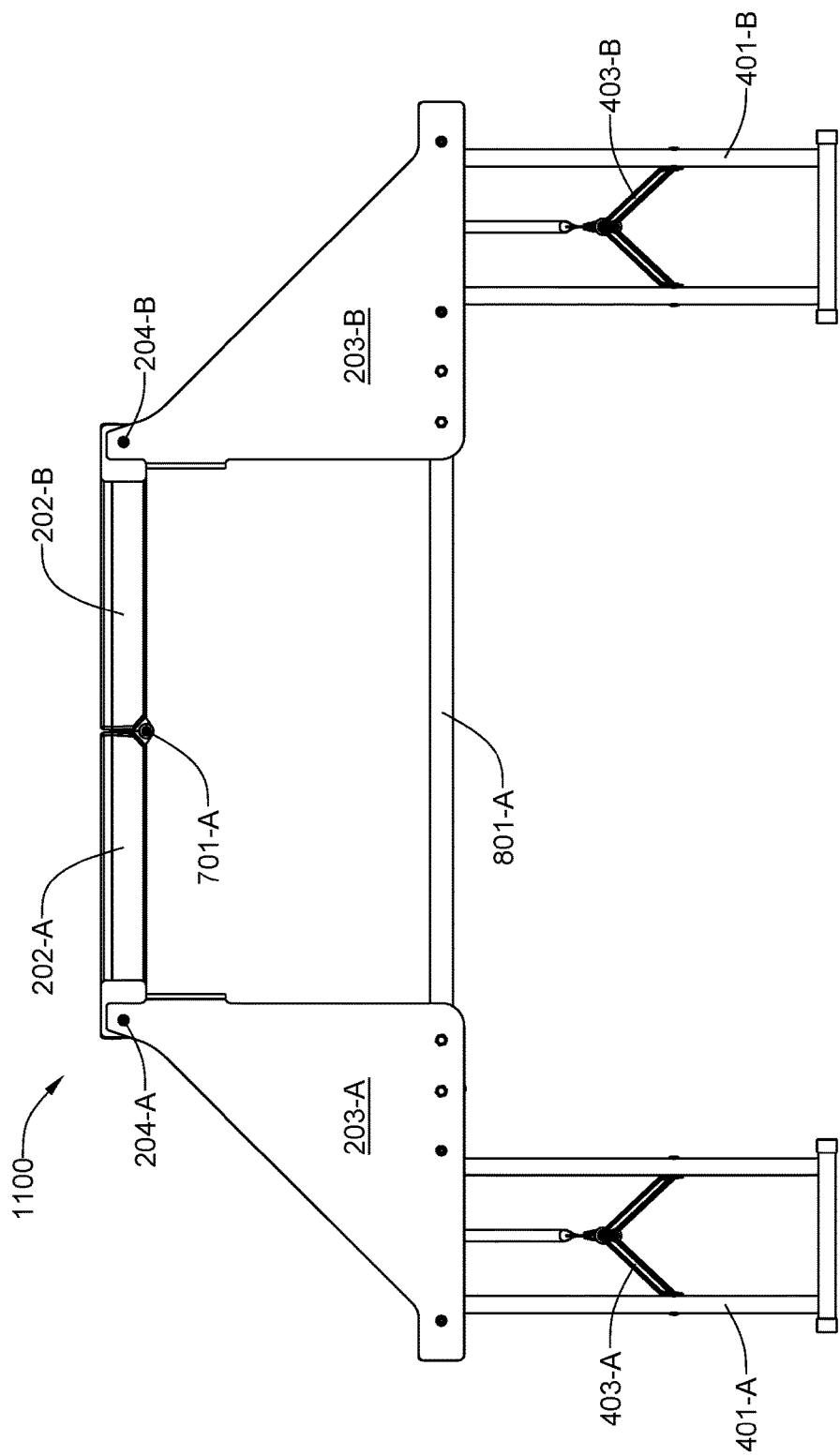
FIG. 13 is a side elevational view of the transformable cargo box in a deployed configuration apart from the carrier and draw bar.
Figure 14:
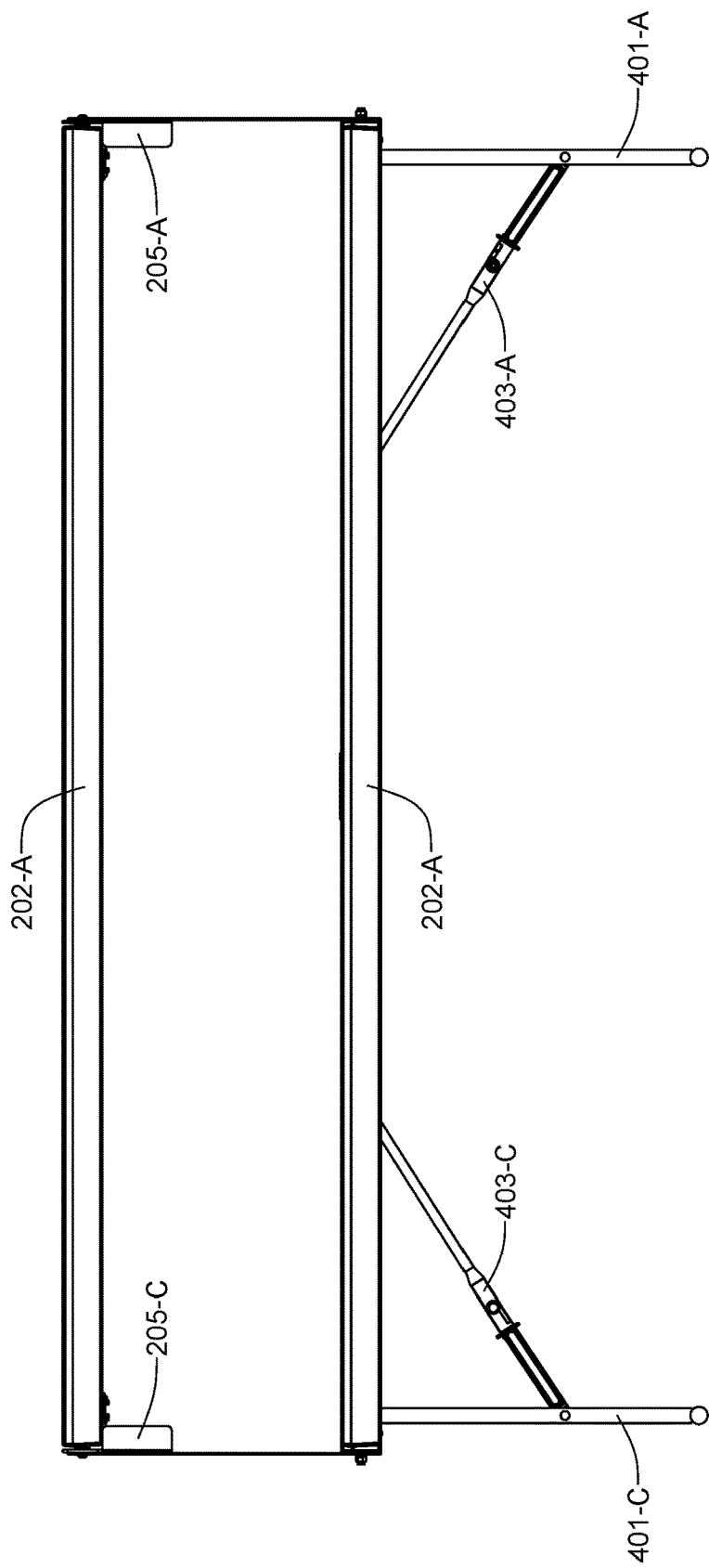
FIG. 14 is a front elevational view of the transformable cargo box in a deployed configuration apart from the carrier and draw bar.
Figure 15:
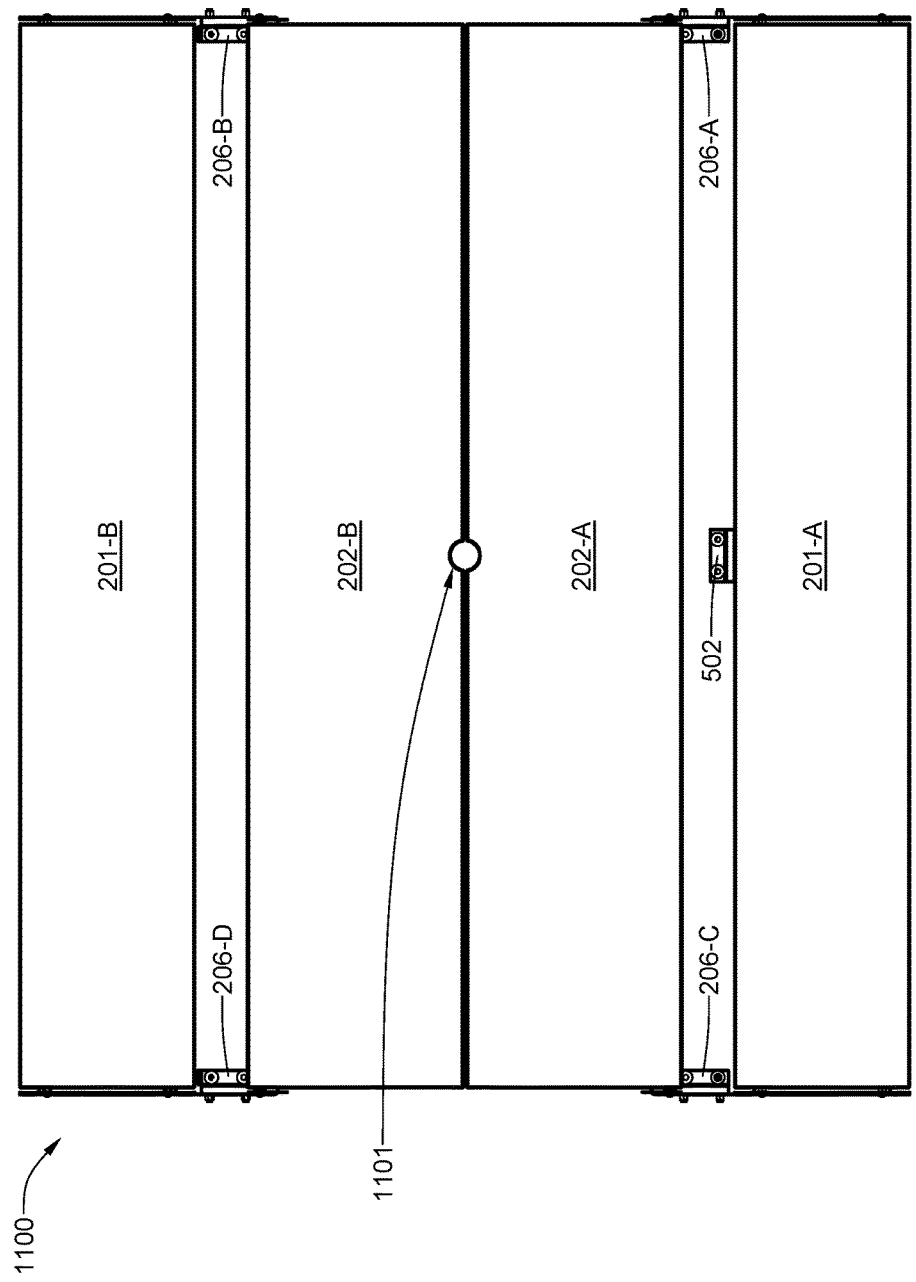
FIG. 15 is a top plan view of the transformable cargo box in a deployed configuration, apart from the carrier and draw bar.

FIG. 12 is a high-elevation, three-quarter isometric view of the transformable cargo box in a deployed configuration apart from the carrier and draw bar;

Referring now to FIGS. 13, 14 and 15, the picnic table with attached benches 1100 is shown in various plan and elevational views, which add very little, if anything, to what has already been shown and described in FIGS. 11 and 12.

Figure 16:
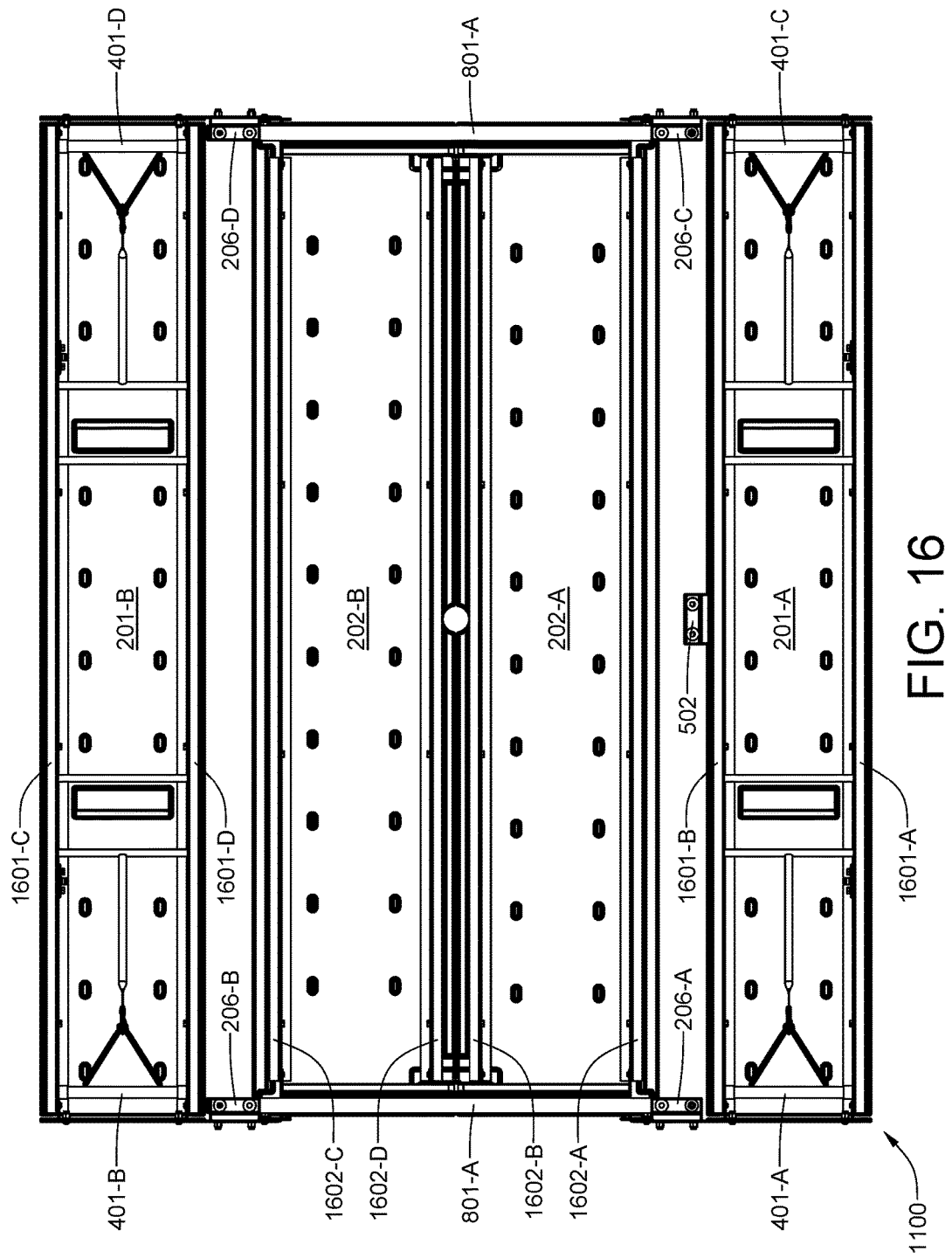
FIG. 16 is a bottom plan view of the transformable cargo box in a deployed configuration, apart from the carrier and draw bar.

Referring now to FIG. 16, the underside of the cargo box transformed into a picnic table with attached benches shows the metal structural members that are used to reinforce the table top halves 202-A and 202-B, as well as the benches 201-A and 201-B. Metal stringers 1601-A and 1601-B are used to reinforce bench 201-A, while metal stringers 1601-C and 1601-D are used to reinforce bench 201-B. Likewise, metal stringers 1602-A and 1602-B are used to reinforce table top half 202-A, while metal strings 1602-C and 1602-D are used to reinforce table top half 202-B.

Referring now to the cross-sectional view of FIG. 17, latches 105-A and 105-B are used to engage the cargo box securing cross tubes 404-A and 404-B when the cargo box 200 is being transported on the carrier 100. It will be noted that actuation lever 105-A is released so that it does not engage cross tube 404-A, which latch 105-B is in a locked position so that it engages cross tube 404-B. This is better shown in the enlarged views of FIGS. 18 and 19, respectively. Actuation levers 106-A and 106-B pivot around pivot pins 1801-A and 1801-B, respectively.

Although only a single embodiment of the new cargo box 200 securable to a carrier 100 couplable and transformable into a picnic table with attached benches on opposite sides thereof, it will be obvious to those having ordinary skill in the art that changes and modifications may be made thereto without departing from the scope and the spirit of the invention as hereinafter claimed.

What is claimed is:

1. A vehicle-supported cargo box transformable into a picnic table with benches comprising:
    a carrier securable to a vehicle;
    an open-top cargo box, releaseably securable to said carrier, said cargo box comprising
        a first bench, having a first pair of attached retractable leg assemblies, that functions as a floor of the box;
        two table top halves, hingedly joined, that function, when folded together, as a rear wall of the box;
        a second bench, having a second pair of attached retractable leg assemblies, that functions as a front wall of the box; and
        four side panels, each of which is rigidly secured to one end of a bench and pivotally secured to a corner of a table top half, which function as side walls of the box;
    wherein, after the cargo box is removed from the carrier, the cargo box is transformed into a table with attached benches by upwardly lifting and rearwardly rotating the second bench and its attached leg assemblies and side panels, unfolding the table top halves to form a two-piece table top having an upper planar surface, extending each of the four retractable leg assemblies and locking them in place so that they are capable of supporting the table and bench configured structure, in addition to seated individuals; and wherein, reconversion of the table and bench configured structure to the open-top cargo box is accomplished via a sequence that is the opposite of the cargo-box-to-table transformation sequence.

2. The vehicle-supported cargo box of claim 1, wherein said carrier is equipped with a draw bar that engages a vehicle receiver hitch.

3. The vehicle-supported cargo box of claim 1, wherein during transformation to a table with attached benches, the second bench and its attached leg assemblies and side panels is rearwardly rotated about 270 degrees.

4. The vehicle-supported cargo box of claim 1, which further comprises first and second end braces, each of which interconnects a pair of opposing side panels at opposite ends of the table, thereby forming a rigid structure.

5. The vehicle-supported cargo box of claim 4, wherein each of said first and second braces detaches from an opposing side panel and folds to store with the bench in the cargo box configuration.

6. The vehicle-supported cargo box of claim 1, wherein three of the interior surfaces of the box are formed from the sitting surface of each of the two benches and a top surface of a table top half to form a generally smooth interior.

7. The vehicle-supported cargo box of claim 1, wherein the carrier is equipped with at least one pivotable latch that secures the first bench to the carrier during transport.

8. The vehicle-supported cargo box of claim 1, wherein the table top halves are hingedly joined along an edge of a bottom surface of each table top half, so that adjoining edges of both halves press against each other when weight is placed on an upper surface of the two-piece table top.

9. The vehicle-supported cargo box of claim 1, wherein each of the four side panels is sufficiently rigid so as to minimize longitudinal movement of the table top with respect to the benches when in use.

10. The vehicle-supported cargo box of claim 1, wherein the table top halves, the bench top halves, and side panels are fabricated from materials selected from the group consisting of wood, laminated wood, structural metals, thermoset plastics, thermoplastics, and fiber-reinforced composites.

11. The vehicle-supported cargo box of claim 10, wherein metal structural members, located on the underside of the benches and table top halves, provide additional strength and rigidity to those components.

12. The transformable vehicle receiver hitch-supported open-top cargo box of claim 1, wherein the carrier is generally rectangular in shape and is fabricated from six pieces of steel angle and one piece of square cross-section steel tubing.

13. The transformable vehicle receiver hitch-supported open-top cargo box of claim 1, wherein the underside of at least one bench is equipped with two spaced-apart cross tubes that are engaged by the latches when the cargo box is being transported on the carrier.

14. An open-top cargo box transformable into a picnic table with benches comprising:
 a first bench, having a first pair of attached retractable leg assemblies, that functions as a floor of the box;
 two table top halves, hingedly joined, that function, when folded together, as a rear wall of the box;
 a second bench, having a second pair of attached retractable leg assemblies, that functions as a front wall of the box; and
 four side panels, each of which is rigidly secured to one end of a bench and pivotally secured to a corner of a table top half, function as side walls of the box;
 wherein, after the cargo box is removed from the carrier, the cargo box is transformed into a table with attached benches by upwardly lifting and rearwardly rotating the second bench and its attached leg assemblies and side panels, unfolding the table top halves to form a two-piece table top having an upper planar surface, extending each of the four retractable leg assemblies and locking them in place so that they are capable of supporting the table and bench configured structure, in addition to seated individuals; and
 wherein, reconversion of the table and bench configured structure to the open-top cargo box is accomplished via a sequence that is the opposite of the cargo-box-to-table transformation sequence.

15. The open-top cargo box of claim 14, which further comprises a carrier equipped with a draw bar that engages a vehicle receiver hitch, said carrier having at least one latch that secures the cargo box to the carrier for transport.

16. The open-top cargo box of claim 14, wherein during transformation to a table with attached benches, the second bench and its attached leg assemblies and side panels is rearwardly rotated about 270 degrees.

17. The open-top cargo box of claim 14, which further comprises first and second end braces, each of which interconnects a pair of opposing side panels at opposite ends of the table, thereby forming a rigid structure.

18. The open-top cargo box of claim 17, wherein each of said first and second braces detaches from an opposing side panel and folds to store with the bench in the cargo box configuration.

19. The open-top cargo box of claim 14, wherein three of the interior surfaces of the box are formed from the sitting surface of each of the two benches and a top surface of a table top half to form a generally smooth interior.

20. The vehicle-supported cargo box of claim 14, wherein the table top halves are hingedly joined along an edge of a bottom surface of each table top half, so that adjoining edges of both halves press against each other when weight is placed on an upper surface of the two-piece table top.

21. An open-top cargo box transformable into a picnic table with benches comprising:
 a first bench that functions as a floor of the box;
 two table top halves, hingedly joined, that function, when folded together, as a rear wall of the box;
 a second bench that functions as a front wall of the box;
 four side panels, each of which is rigidly secured to one end of a bench and pivotally secured to a corner of a table top half, function as side walls of the box; and
 at least one leg assembly for each bench;
 wherein, the cargo box is transformed into a table with attached benches by upwardly lifting and rearwardly rotating the second bench and its attached leg assemblies and side panels, unfolding the table top halves to form a two-piece table top having an upper planar surface, erecting the leg assemblies beneath the benches so that they are capable of supporting the table and bench configured structure, in addition to seated individuals; and
 wherein, reconversion of the table and bench configured structure to the open-top cargo box is accomplished via a sequence that is the opposite of the cargo-box-to-table transformation sequence.

22. The open-top cargo box transformable into a picnic table with benches of claim 21, wherein each bench is provided with a pair of spaced-apart retractable leg assemblies, each of which is equipped with a folding strut that is attached to both that leg assembly and the bench, said folding strut unfolding and locking as the leg assembly, to which it is attached, is downwardly extended, thereby rigidifying that leg assembly.

23. The open-top cargo box of claim 21, which further comprises a carrier equipped with a draw bar that engages a vehicle receiver hitch, said carrier having at least one latch that secures the cargo box to the carrier for transport.

24. The open-top cargo box of claim 21, wherein during transformation to a table with attached benches, the second bench and its attached leg assemblies and side panels is rearwardly rotated about 270 degrees.

25. The open-top cargo box of claim 21, which further comprises first and second end braces, each of which interconnects a pair of opposing side panels at opposite ends of the table, thereby forming a rigid structure.

26. The vehicle-supported cargo box of claim 21, wherein the table top halves are hingedly joined along an edge of a bottom surface of each table top half, so that adjoining edges of both halves press against each other when weight is placed on an upper surface of the two-piece table top.

27. The vehicle-supported cargo box of claim 21, wherein the table top halves, the bench top halves, and side panels are fabricated from materials selected from the group consisting of wood, laminated wood, structural metals, thermoset plastics, thermoplastics, and fiber-reinforced composites.

* * * * *